United States Patent
Srikant et al.

(10) Patent No.: US 6,583,922 B2
(45) Date of Patent: Jun. 24, 2003

(54) OPTICAL AMPLIFIER SITE WITH REDUCED NOISE AND TRANSMISSION SYSTEM UTILIZING SUCH

(75) Inventors: V Srikant, Evanston, IL (US); Martin R Williams, Corning, NY (US)

(73) Assignee: Corning Incorporated, Corning, NY (US)

( * ) Notice: Subject to any disclaimer, the term of this patent is extended or adjusted under 35 U.S.C. 154(b) by 0 days.

(21) Appl. No.: 10/185,935

(22) Filed: Jun. 28, 2002

(65) Prior Publication Data

US 2003/0030891 A1 Feb. 13, 2003

Related U.S. Application Data

(60) Provisional application No. 60/310,662, filed on Aug. 7, 2001.

(51) Int. Cl.[7] ................................................ H01S 3/00
(52) U.S. Cl. ........................................ 359/337; 359/337.4
(58) Field of Search ............................... 359/334, 337.4, 359/337

(56) References Cited

U.S. PATENT DOCUMENTS 6,172,803 B1 * 1/2001 Masuda et al. ............. 359/341
6,466,362 B1 * 10/2002 Friedrich .................... 359/334

* cited by examiner

*Primary Examiner*—Mark Hellner
(74) *Attorney, Agent, or Firm*—Svetlana Z. Short

(57) ABSTRACT

An optical amplifier site comprising: (i) a distributed Raman amplifier providing a first signal gain level; (ii) an optical amplifier located downstream from the distributed Raman amplifier, the optical amplifier being indirectly coupled to the distributed Raman amplifier, the optical amplifier including a first amplification medium, providing a second signal gain level; (iii) at least one optical signal loss element located between the distributed Raman amplifier and the optical amplifier and, contributing at least 0.5 dB optical loss to the amplifier site; (iv) a second amplification medium located down-stream from the first amplification medium; and (v) at least another one optical signal loss element, this at least another one optical signal loss element being located between said first amplification medium and said second amplification medium.

18 Claims, 3 Drawing Sheets

◆ Input Power = −3.4
■ Input Power = 1.6
△ Input Power = 6.6
□ Input Power = 11.6
● Input Power = 15.6

OPTICAL AMPLIFIER SITE WITH REDUCED NOISE AND TRANSMISSION SYSTEM UTILIZING SUCH

CROSS-REFERENCE TO RELATED APPLICATIONS

This application claims the benefit of U.S. Provisional Application Serial No. 60/310,662, filed Aug. 7, 2001 entitled Method To Improve Noise Accumulation At An Amplifier Site, by V Srikant and Martin R. Williams.

FIELD OF THE INVENTION

This invention generally concerns optical amplifiers, and is particularly directed to a method of distributing loss among two or more optical amplifiers to reduce overall noise accumulation from an amplifier site.

BACKGROUND

Optical amplifiers for amplifying photonic signals transmitted through optical fiber networks are well known in the art. Such amplifiers are used to extend transmission distances and to compensate for losses from various network elements. Presently, there are several known types of optical amplifiers, including erbium-doped fiber amplifiers (EDFAs), and Raman amplifiers.

EDFAs typically comprise at least one pump laser whose output is optically coupled to at least one coil of erbium-doped optical fiber. In operation, the output of the pump laser excites the atoms of the erbium-dopant within the fiber. These excited atoms release their excess energy in proportion to the strength of the incoming optical signal, which results in an amplified output. By contrast, Raman amplifiers achieve amplification without the need for erbium-doped optical fibers. Therefore, Raman amplifiers may use optical fibers without Er dopant as their gain fiber.

In one type of Raman amplifier, the output of a pair of orthogonally polarized pump-diode lasers provides backward propagating pump power in the gain fiber. Alternatively, a single pump and a de-polarizer may also be utilized to provide pump power in the gain fiber. Forward-propagating signals are amplified in the gain fiber by higher energy (shorter wavelength) pump photons scattering off the vibrational modes of the optical fiber's lattice matrix and coherently adding to the lower-energy (longer wavelength) signal photons.

Raman amplifiers may be one of two types, depending upon the type of the gain fiber used therein. Distributed Raman amplifiers advantageously use the optical transmission fiber itself as the gain fiber. By contrast, discrete Raman amplifiers utilize their own optical fiber as the gain fiber. While the dopant used in the gain fiber of a discrete Raman amplifier is typically the same as used in the optical transmission fiber (e.g., germanium), the gain fiber of the discrete Raman amplifier usually contains higher concentrations of dopant (such as germanium) than a conventional optical transmission fiber and is designed to operate with a decreased fiber effective area in order to provide gain fiber with a a higher non-linear coefficient.

Furthermore, with the increasing demand for more data traffic, more transmission system providers are interested in providing high bit rate (40 Gbs, or higher) transmission systems. For transmission systems operating at a high bit rate, Signal to Noise ratio (S/N) becomes more of a problem than for the slower transmission systems. Therefore, managing generation and accumulation of optical noise in in transmission systems is very important. This optical noise is generated by the amplification process itself (for example, amplified spontaneous emission (ASE) noise).

One way of improving the Signal to Noise ratio in a high bit rate transmission system is to utilize the distributed Raman amplifiers in conjunction with EDFAs or other discrete optical amplifiers. Distributed Raman amplifiers distribute amplification along the length of the transmission fiber, resulting in a lower optical noise contribution from the optical amplifier sites (also referred to as huts). More specifically, the optical noise becomes attenuated because the amplification is spread over the length of the transmission fiber and is not concentrated at the site location. An optical amplifier site or hut includes one or several discrete optical amplifiers situated proximately to one another and coupled to the transmission fiber. It may also include a Raman pump module for the distributed Raman amplifier which comprises one or more pump sources; pump power or temperature control unit(s); environmental change sensor(s) or other optical components such as couplers, connectors or taps.

SUMMARY OF THE INVENTION

An optical An optical amplifier site connected to a distributed Raman amplifier fiber, the optical amplifier site comprising:

(i) a distributed Raman amplifier pump module, connected to the distributed Raman amplifier fiber, such that the Raman amplifier fiber and the pump module form a distributed Raman amplifier that provides a first signal gain level, the first gain level being greater than 10 dB;

(ii) an optical amplifier located downstream from the distributed Raman amplifier, the optical amplifier being indirectly coupled to the distributed Raman amplifier, the optical amplifier including a first amplification medium, providing a second signal gain level;

(iii) at least one active optical signal loss element located between the distributed Raman amplifier and the optical amplifier, the at least one loss element contributing to optical loss of the amplifier site and providing at least 0.5 dB loss;

(iv) a second amplification medium located down stream from the first amplification medium;

(v) at least another one active optical signal loss element, the at least another one optical signal loss element being located between the first amplification medium and the second amplification medium.

One advantage of the present invention is the reduction of noise of the transmission systems and to increase in performance of amplifier sites.

BRIEF DESCRIPTION OF THE DRAWING

The invention will be described through the embodiments and the attached drawing in which.

DETAILED DESCRIPTION OF THE PREFERRED EMBODIMENT

It is known that for a given signal level, the reduction of optical noise in the transmission system will improve the S/N ratio. Applicants discovered that the Noise Figure, NF (which characterizes the amount of optical noise present) of an amplifier site is dependent on the location of the required active loss elements. The active loss elements are elements or components that in addition of introducing optical loss also provide a specified function, other than a connection or a coupling function. The active loss elements may be, for example: optical circulators; transmission systems' GFFs, VOAs or optical isolators; dispersion compensation modules; multiplexers; demultiplexers. As defined herein, the term "active loss elements" means optical components or elements performing a predetermined function, other than provision of loss and (i) does not encompass splices or connectors and (ii) also excludes optical components or elements strictly associated with formation of a functional amplifier. These excluded elements are optical components of the discrete amplifiers such as: optical isolators, gain flattening filters, wavelength division multiplexers WDMs for coupling signal and pump energy into the optical fiber, taps, and/or VOAs.

Applicant had further discovered a critical relationship between active loss element location, the amount of loss contributed by this element and the Noise Figure NF contribution of the optical amplifiers associated with the amplifier site. This relationship can be utilized to reduce the NF and to improve the S/N ratio. Applicants were surprised to discover that it is preferable (i) for at least one of the active loss elements to be associated with an amplifier other than the distributed Raman amplifier (mid stage loss, MSL); and (ii) for at least one other active loss element to be located between the distributed Raman amplifier and the adjacent amplifier located down-stream from the distributed Raman amplifier at the amplifier site. Mid stage loss MSL is produced, for example, by active loss elements that are located, between two amplification stages (each including one amplification medium) of a discrete amplifier, or by being located between a pre-amplifier and a post amplifier, where both amplifiers are discrete amplifiers.

Figure 1:
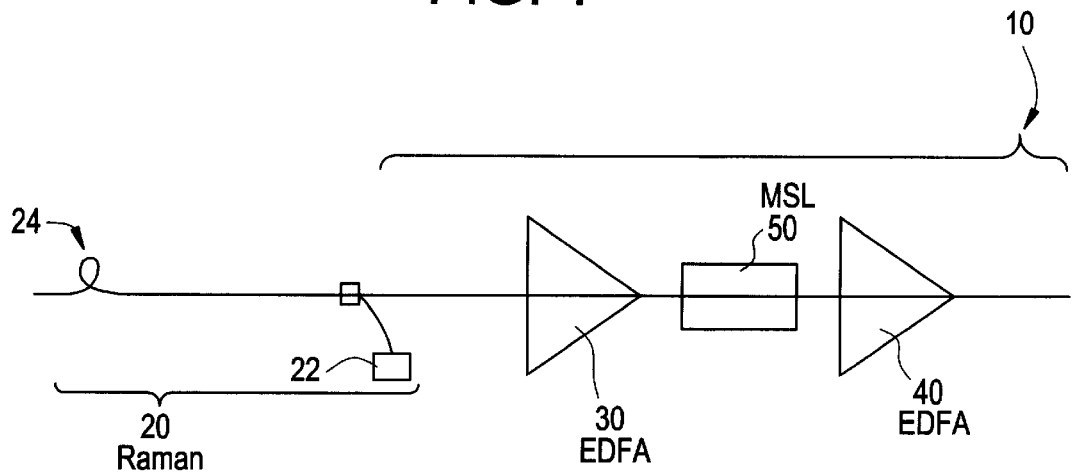
FIG. 1 illustrates an exemplary amplifier site that includes two discrete erbium doped fiber amplifiers (EDFAs) connected in series to a distributed Raman amplifier.

FIG. 1 illustrates a test set-up for determining the relationship between the Noise Figure NF, input signal power and the amount of loss provided by the active elements associated with mid-stage loss (MSL). That is, in this case, all of the active loss elements are located between two stages of a discrete optical amplifier or between two discrete optical amplifiers.

More specifically, FIG. 1 illustrates an amplifier site 10 including a distributed Raman amplifier 20 coupled to an erbium doped fiber preamplifier 30 which is coupled to (a power) Er doped amplifier 40. More specifically, the distributed Raman amplifier 20 includes the Raman pump module containing at least one Raman pump source 22. The Raman pump module introduces light into the optical fiber 24 to achieve Raman amplification. Optical fiber 24 may be, for example, a transmission fiber with a length of approximately from 50 km to about 150 km.

A mid-stage active loss element 50, such as, for example a dispersion compensating module or a multiplexer, are located between the two discrete Er doped fiber amplifiers 30 and 40. In this example, all of the active loss elements were located between the two Er doped amplifiers 30 and 40. A discrete amplifier is a self contained amplifier—i.e, an amplifier with the amplification medium contained inside a housing situated at a specified amplifier site.

Previously, those skilled in the art of optical communication system design believed that in traditional transmission systems (i.e, in transmission systems where the span losses (losses between two amplifier sites) were between 22 and 25 dB and the Raman gain was 10 dB, or less) that active loss elements should not be placed between the distributed Raman amplifier and the Erbium doped amplifier because, such placement of the active loss elements increases the Noise Figure NF. However, applicants were surprised to discover that, if the span losses are lower than 23 dB (and preferably below 21 dB) and/or distributed Raman amplifier provides at least 10 dB gain, it is: (i) preferable to distribute the placement of active loss elements, and (ii) disadvantageous to place all active loss elements in the mid-stage (i.e., between two discrete amplifiers or two stages of a discrete amplifier).

Figure 2:
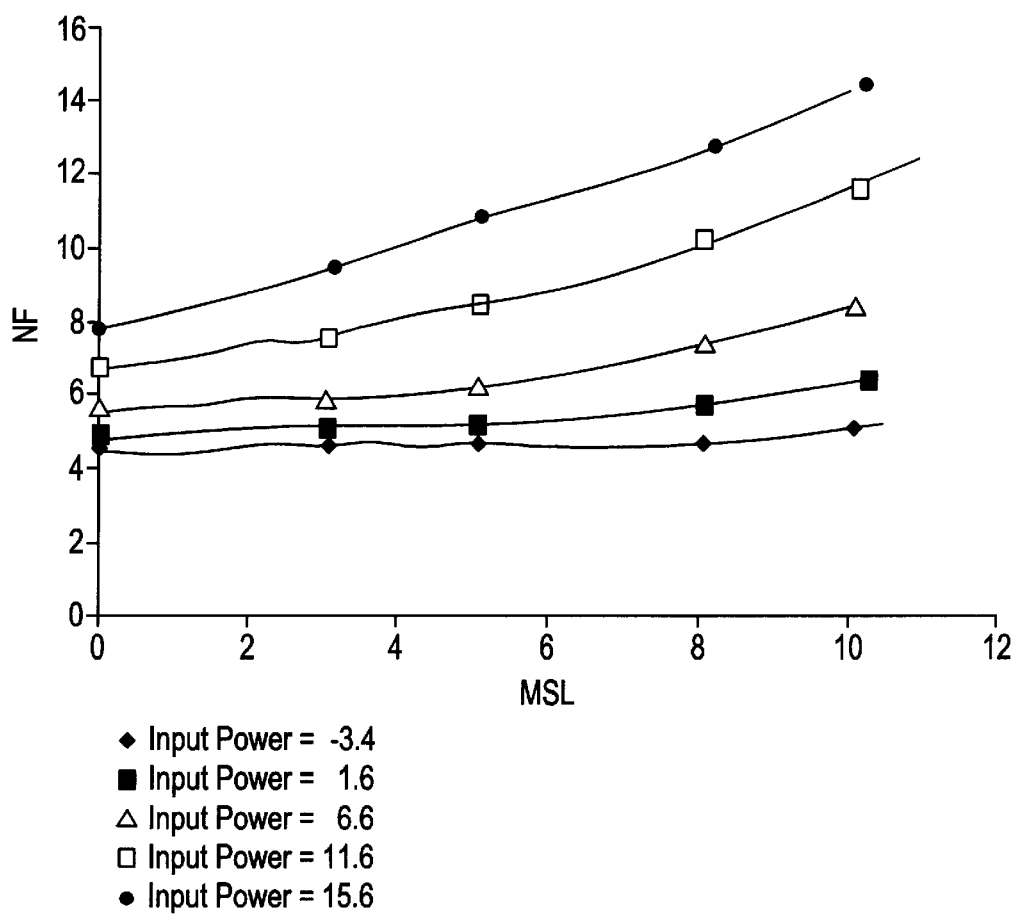
FIG. 2 is a graph showing the relationship between the NF (dB) of the EDFA and the mid stage loss (MSL) (dB) embedded in the EDFA, for various amounts of the total optical signal input powers (dBm) provided to the EDFA.

Applicants realized that because Raman amplification increases the total signal power in a span, the input signal power provided to the discrete amplifier situated adjacent to (and downstream of) the distributed Raman 20 amplifier also increases. The term "span" refers to the length of the transmission fiber or of the gain fiber of the distributed Raman amplifier (which may be the transmission fiber or a specialized fiber separate from the transmission fiber) situated between two amplifier sites. Applicants also realized that if all of the loss elements or components (shown as mid-stage loss elements, MSL, 50) are located between the two stages of the discrete optical amplifier (for example, EDFA), or between two discrete amplifiers 30, 40, as the input powers into the first discrete amplifier 30 increased, the Noise Figure NF, measured at the output from the last discrete amplifier 40 of the amplifier site also increased. This is illustrated in FIG. 2. FIG. 2 also illustrates that as the amount of mid-stage loss contributed to by the active loss elements increased, the Noise Figure associated with the higher signal power input levels increased dramatically. More specifically, the horizontal axis of FIG. 2 represents the amount of MSL loss, which was measured to be from 0 dB to 10 dB. The vertical axis represents the Noise Figure, NF, measured in dB. The curve associated with the dark rhombus corresponds to the signal input power of −3.4 dBm. The curve associated with the dark square symbols corresponds to the signal input power of 1.6 dBm. The curve associated with the triangle symbols corresponds to the signal input power of 6.6 dBm. The curve associated with the light square symbols corresponds to the signal input power of 11.6 dBm. The curve associated with the circle symbols corresponds to the signal input power of 15.6 dBm. Thus, FIG. 2 illustrates that as the input power into the amplifier 30 increased, the Noise Figure NF measured at the output of the discrete amplifier 40 increased as well. For the amplifier site configuration of FIG. 1, the NF was greater when the mid-stage active loss elements 50 contributed a larger amount of optical loss to the amplifier site.

Figure 3:
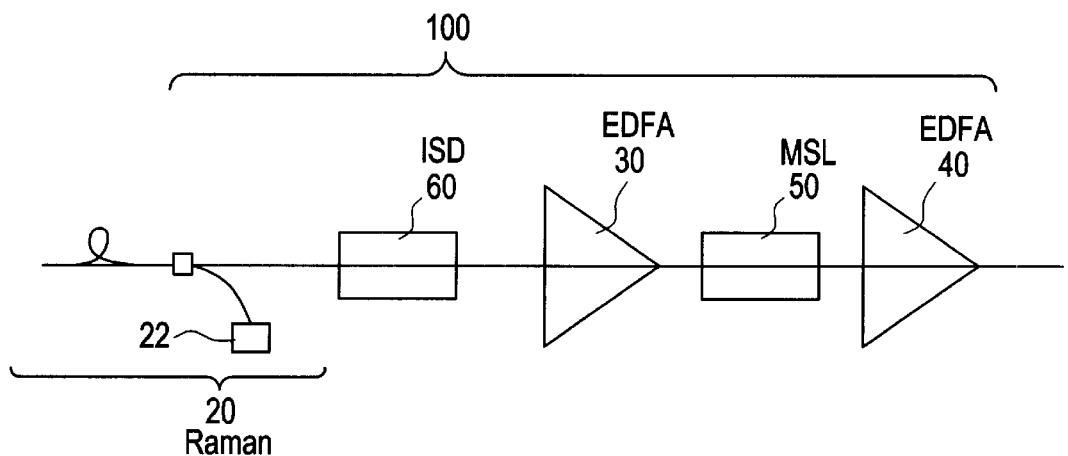
FIG. 3 is a schematic illustration of the first embodiment of an amplifier site, including optical amplifiers and loss components.

FIG. 3 illustrates a modeled optical amplifier site 100 that utilizes an arrangement of active loss elements and optical amplifiers in accordance with the first embodiment of the present invention. The amplifier site 100 is similar to the amplifier site 10 illustrated in FIG. 1. The amplifier site 100 includes a distributed Raman amplifier 20 coupled to the first discrete amplifier 30, such as, for example Er doped fiber preamplifier, that is coupled to a second discrete amplifier 40, such as, for example Er doped fiber amplifier. As in the amplifier site 10, at least one mid-stage active loss element 50 is located between the two discrete amplifiers 30 and 40. However, in this embodiment of the present invention at least one active loss element (inter-stage device ISD) 60 is located between the distributed Raman amplifier 20 and the first discrete amplifier 30. Thus, optical losses due to active loss elements were distributed among at least two locations within the amplifier site 100.

Figure 4:
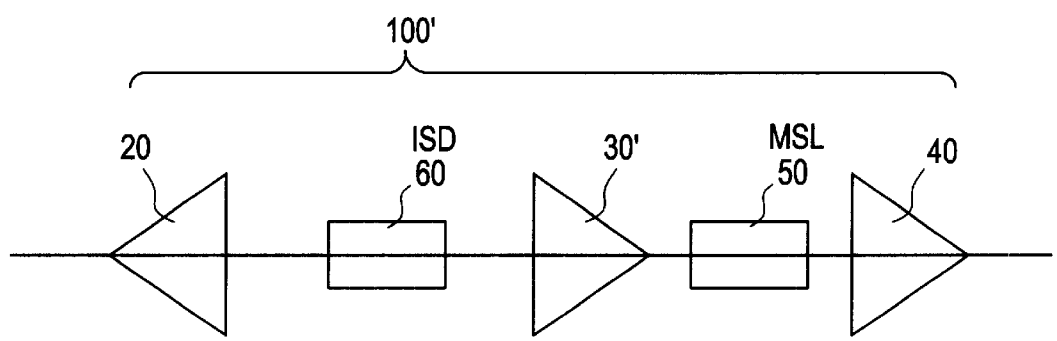
FIG. 4 is a schematic illustration of the second embodiment of an amplifier site, including optical amplifiers and loss components.

Although in the above described embodiment the discrete amplifiers 30 and 40 are Er doped fiber amplifiers, other types of discrete amplifiers may also be utilized. One embodiment of such amplifier arrangement is illustrated schematically in FIG. 4. More specifically, the amplifier site 100' illustrated in FIG. 4 is similar to that illustrated on FIG. 3, but utilizes a discrete Raman amplifier 30' instead of the Er doped fiber amplifier 30. Alternatively, a discrete Raman amplifier may be used instead of, or in conjunction with, the discrete optical amplifier 40. Other discrete amplifier types, for example semiconductor amplifiers, may also be utilized.

Figure 5:
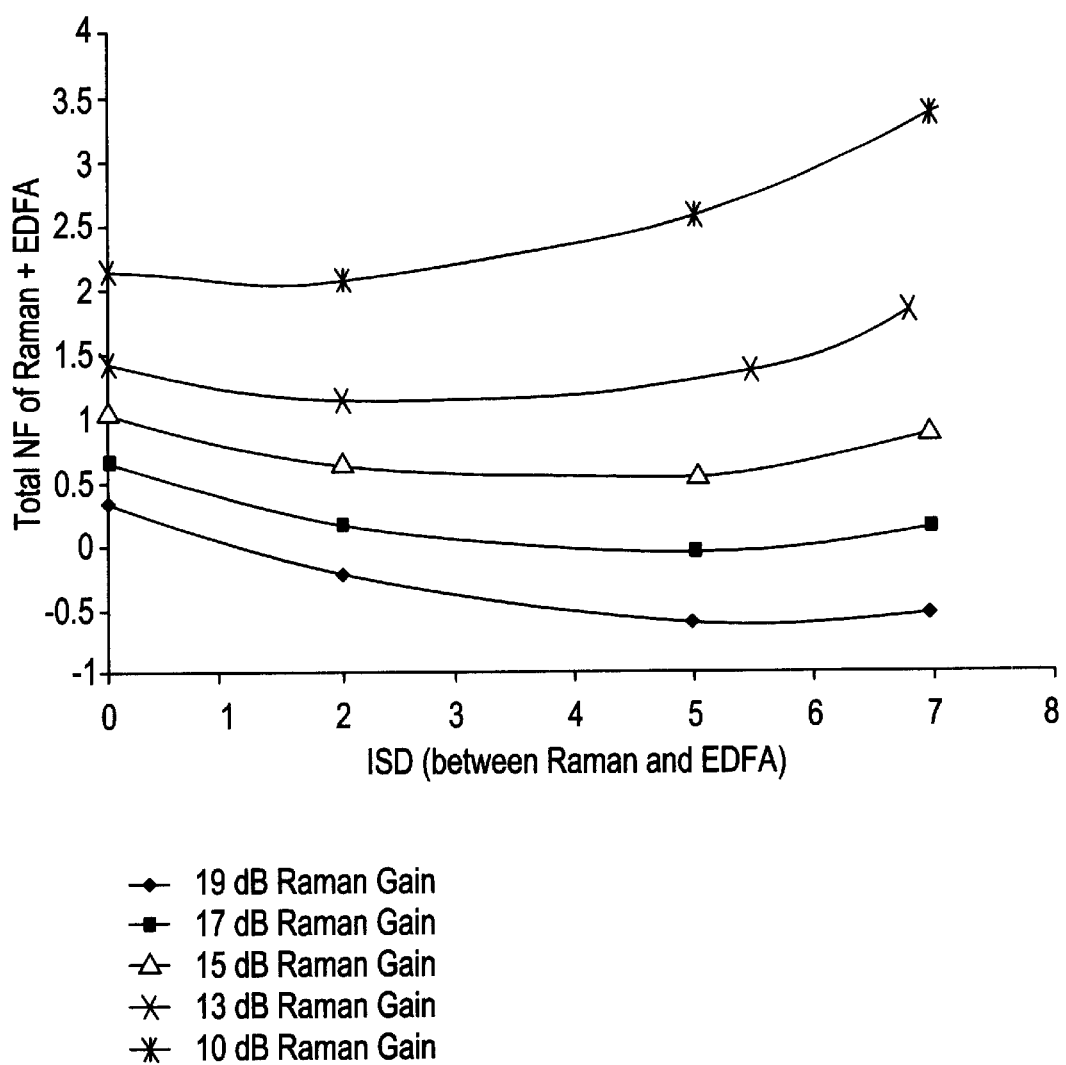
FIG. 5 is a graph showing the relationship between the total Noise Figure of the amplifier site (including Raman and EDFA) of FIG. 3 and the loss contributed by the loss elements located between the distributed Raman amplifier and the first EDFA (i.e., ISD loss). Total loss amount was kept constant at 10 dB, (i.e., ISD+MSL=10 dB).

FIG. 5 illustrates the change in the total NF of an amplifier site 100 as a function of the amount of loss provided by the active loss elements 60 located between the distributed Raman amplifier 20 and the discrete amplifier 30. The following attributes were utilized in the model: Span loss was measured at 21 dB, signal power of 1 dBm was launched in each amplifier channel; the total number of channels was 48, at a bit rate of 40 Gbs. The analysis was performed in the C band signal range (about 1525 nm to about 1565 nm), but applicants believe that similar results would also be obtained in the L-band signal range ($1565 \leq \lambda s \leq 1625$ nm). The total optical loss due to the active loss elements was held to 10 dB (i.e., ISD+MSL=10 dB). It is noted that when Raman gain is 10 dB, as indicated by a curve with the associated X symbol, Noise Figure NF increases with increased optical loss generated by the active loss elements 60 (ISD). However, when the signal gain provided by the distributed Raman amplifier 20 is above 10 dB, the Noise Figure NF is much smaller when some of this optical loss is generated by the active loss elements (ISD) 60. Furthermore, as the amount of optical signal loss contributed by these active loss elements increased from about 0.5 dB to about 7 dB, the overall Noise Figure NF became better. Thus, it is preferred that the amount of optical signal loss contributed by these loss element(s) be between 1 dB and 10 dB, and more preferably between 1 dB and 7 dB, and most preferably between 1 dB and 5 dB. It is preferred that the distributed Raman amplifier operate in 1300 nm to 50 nm signal range, and more preferably in the 1525–1625 signal range, in order to provide at least C and L band amplification. Raman gain (amplification) fiber 24 may include a dispersion shifted fiber or a dispersion flattened fiber (i.e. fiber with average dispersion values that are about the same across different channels). The gain fiber 24 can be doped as needed but preferably is not doped with a rare earth element. It is preferred that the gain provided by the distributed Raman amplifier be above 10 dB.

The invention can be applied to any type of amplifier site, The amplifier site may utilize multiple channel amplifiers and/or single channel amplifiers. The transmitted signal can be of any type and can be for any application.

The invention has been described through preferred embodiments. However, various modifications can be made without departing from the scope of the invention as defined by the appended claims and legal equivalents.

What is claimed:

1. An optical amplifier site connected to a distributed Raman amplifier fiber, said optical amplifier site comprising:
  (vi) a distributed Raman amplifier pump module, connected to said distributed Raman amplifier fiber, such that said Raman amplifier fiber and said pump module form a distributed Raman amplifier that provides a first signal gain level, said first gain level being greater than 10 dB;
  (vii) an optical amplifier located downstream from said distributed Raman amplifier, said optical amplifier being indirectly coupled to said distributed Raman amplifier, said optical amplifier including a first amplification medium, providing a second signal gain level;
  (viii) at least one active optical signal loss element located between said distributed Raman amplifier and said optical amplifier, said at least one loss element contributing to optical loss of said amplifier site and providing at least 0.5 dB loss;
  (ix) a second amplification medium located down stream from said first amplification medium;
  (x) at least another one active optical signal loss element, said at least another one optical signal loss element being located between said first amplification medium and said second amplification medium.

2. The optical amplifier site according to claim 1, wherein said first amplification medium Er doped fiber coil and second amplification medium is Er doped fiber coil.

3. The optical amplifier site according to claim 1, wherein said optical amplifier is a multi stage Er doped amplifier, said first amplification medium is included in a first stage of said optical amplifier and said second amplification medium is included in a second stage of said optical amplifier.

4. The optical amplifier site according to claim 1, wherein said amplifier site includes a second optical amplifier, said second optical amplifier including said second amplification medium.

5. The optical amplifier site according to claim 1, wherein said at least one active optical signal loss element located between said distributed Raman amplifier and said optical amplifier provides at least 1 dB loss.

6. The optical amplifier site according to claim 5, wherein said loss is between 1 dB and 10 dB.

7. The optical amplifier site according to claim 5, wherein said loss is between 1 dB and 7 dB.

8. The optical amplifier site according to claim 5, wherein said loss is between 1 dB and 5 dB.

9. The optical amplifier site according to claim 1, wherein said first signal gain level is larger than 10 dB.

10. The optical amplifier site according to claim 1, wherein span loss associated with the distributed Raman amplifier fiber is less than 21 dB.

11. The optical amplifier site according to claim 1, wherein said optical signals amplified are within 1525 nm and 1625 nm wavelength band.

12. The optical amplifier site according to claim 1, wherein said Raman amplifier utilizes optical transmission fiber as gain fiber.

13. The optical amplifier site according to claim 12, wherein said optical transmission fiber is not doped with a rare earth element.

14. The optical amplifier site according to claim 12, wherein said Raman amplifier utilizes dispersion flattened fiber.

15. An optical amplifier site connected to a distributed Raman amplifier fiber, said optical amplifier site comprising: (i) a distributed Raman amplifier pump module, connected to said distributed Raman amplifier fiber, such that said Raman amplifier fiber and said pump module form a distributed Raman amplifier that provides a first signal gain level; (ii) an optical amplifier located downstream from said distributed Raman amplifier, said optical amplifier being indirectly coupled to said distributed Raman amplifier, said optical amplifier including a first amplification medium, providing a second signal gain level; (iii) at least one active optical signal loss element located between said distributed Raman amplifier and said optical amplifier, said at least one active optical signal loss element contributing to optical loss of said amplifier site and providing a first amount of optical signal loss, said first amount of optical signal loss being at least 0.5 dB; (iv) a second amplification medium located down stream from said first amplification medium; (v) at least another one active optical signal loss element providing a second amount of optical signal loss, said at least another one active optical signal loss element being located between said first amplification medium and said second amplification medium; and (vi) wherein said amplifier site has an improved Noise Figure NF when compared to an amplifier site without said at least one active optical signal loss element located between said distributed Raman amplifier and said optical amplifier, so that all optical signal loss elements are situated between said first amplification medium and said second amplification medium, such that said the active optical signal loss elements that are being located between said first amplification medium and said second amplification medium provide an amount of loss that equals to the sum of the first amount of optical signal loss and the second amount of optical signal loss.

16. A transmission system comprising: (i) a distributed Raman amplifier that provides a first signal gain level of more than 10 dB; (ii) a discrete optical amplifier located downstream from said distributed Raman amplifier, said discrete optical amplifier being indirectly coupled to said distributed Raman amplifier, said discrete optical amplifier including a first amplification medium, providing a second signal gain level; (iii) at least one active optical signal loss element located between said distributed Raman amplifier and said optical amplifier, said at least one loss element contributing to optical loss of said amplifier site and providing at least 0.5 dB loss; (iv) a second amplification medium located down stream from said first amplification medium; (v) at least another one active optical signal loss element, said at least another one optical signal loss element being located between said first amplification medium and said second amplification medium.

17. The optical amplifier site according to claim 16, wherein said discrete optical amplifier is a multi stage Er doped amplifier, said first amplification medium is included in a first stage of said discrete optical amplifier and said second amplification medium is included in a second stage of said optical amplifier.

18. The optical amplifier site according to claim 1, wherein said amplifier site includes a second discrete optical amplifier, said second discrete optical amplifier including said second amplification medium.

* * * * *